US010579217B2

(12) United States Patent
Nixon et al.

(10) Patent No.: US 10,579,217 B2
(45) Date of Patent: Mar. 3, 2020

(54) SYSTEM AND METHOD FOR PRESENTING A CUSTOMIZABLE GRAPHICAL VIEW OF A SYSTEM STATUS TO IDENTIFY SYSTEM FAILURES

(71) Applicant: Honeywell International Inc., Morris Plains, NJ (US)

(72) Inventors: David Ross Nixon, Freshwater (AU); Zi Ming Gao, Normanhurst (AU); Adam Lindsay Delpech, Padstow (AU); David Barry Granatelli, Lilyfield (AU)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 15/264,543

(22) Filed: Sep. 13, 2016

(65) Prior Publication Data

US 2018/0074660 A1 Mar. 15, 2018

(51) Int. Cl.
*G06F 3/0482* (2013.01)
*G06F 3/0484* (2013.01)
*G06F 3/0481* (2013.01)
*G06F 9/451* (2018.01)
(Continued)

(52) U.S. Cl.
CPC ....... *G06F 3/0482* (2013.01); *G05B 23/0272* (2013.01); *G06F 3/0481* (2013.01); *G06F 3/04817* (2013.01); *G06F 3/04847* (2013.01); *G06F 9/451* (2018.02); *G08B 21/185* (2013.01); *G05B 2219/23258* (2013.01)

(58) Field of Classification Search
CPC .. G06F 3/04817; G06F 3/0482; G08B 21/185
See application file for complete search history.

(56) References Cited

U.S. PATENT DOCUMENTS

| 2007/0174225 A1* | 7/2007 | Blevins | G06F 9/4488 340/3.9 |
| 2011/0144777 A1* | 6/2011 | Firkins | G05B 23/027 700/80 |

(Continued)

FOREIGN PATENT DOCUMENTS

| KR | 1020140113130 | 9/2014 |
| KR | 1020160000468 | 1/2016 |

OTHER PUBLICATIONS

International Search Report and Written Opinion of the International Searching Authority for PCT Patent Application No. PCT/US2017/050516 dated Dec. 15, 2017, 11 pages.

*Primary Examiner* — Jennifer N To
*Assistant Examiner* — Reji Kartholy

(57) ABSTRACT

An embodiment of this disclosure provides a method for presentation of system alarms. The method includes obtaining information associated with a plurality of sections in an industrial process control and automation system. The information includes, for each section of the plurality of sections, an operating status, an alarm status, and a location within the system. The method also includes displaying a dashboard including the plurality of sections in a hierarchical format. The method also includes, for each of the plurality of sections, displaying an icon for the section and displaying visual indicators for the alarm status of the section and the operating status of the section.

15 Claims, 8 Drawing Sheets

(51) Int. Cl.
  *G05B 23/02* (2006.01)
  *G08B 21/18* (2006.01)

(56) References Cited

U.S. PATENT DOCUMENTS

| | | | |
|---|---|---|---|
| 2012/0004780 A1* | 1/2012 | Miller | H01L 31/02021 |
| | | | 700/286 |
| 2013/0002697 A1* | 1/2013 | Ashley | G06T 11/206 |
| | | | 345/589 |
| 2013/0131843 A1 | 5/2013 | Gohr | |
| 2014/0108985 A1* | 4/2014 | Scott | G05B 15/02 |
| | | | 715/771 |
| 2015/0212717 A1* | 7/2015 | Nair | G06F 9/451 |
| | | | 715/769 |
| 2015/0227135 A1* | 8/2015 | McAdam | G05B 19/414 |
| | | | 700/83 |
| 2017/0201425 A1* | 7/2017 | Marinelli | H04L 41/12 |

* cited by examiner

SYSTEM AND METHOD FOR PRESENTING A CUSTOMIZABLE GRAPHICAL VIEW OF A SYSTEM STATUS TO IDENTIFY SYSTEM FAILURES

TECHNICAL FIELD

This disclosure relates generally to an alarm system. More specifically, this disclosure relates to a system and method for presenting a graphical view of a system status to identify system failures.

BACKGROUND

Modern automation and control systems have such a large number and variety of control system equipment that monitoring the health of this equipment and diagnosing problems can be difficult. Control systems that have a textual alarm-based error reporting system present a prioritized list of failures with some specific information about the problem. When there are many alarms, they become difficult for an operator to process and downstream consequences of upstream problems are more difficult to diagnose and prioritize.

SUMMARY

This disclosure provides a system and method for presenting a customizable graphical view of a system status to identify system failures.

A first embodiment of this disclosure provides a method for presentation of system alarms. The method includes obtaining information associated with a plurality of sections in an industrial process control and automation system. The information includes, for each section of the plurality of sections, an operating status, an alarm status, and a location within the system. The method also includes displaying a dashboard including the plurality of sections in a hierarchical format. The method also includes, for each of the plurality of sections, displaying an icon for the section and displaying visual indicators for the alarm status of the section and the operating status of the section.

A second embodiment of this disclosure provides an apparatus for presentation of system alarms. The apparatus includes a memory configured to store information associated with a plurality of sections in an industrial process control and automation system. The information includes, for each section of the plurality of sections, an operating status, an alarm status, and a location within the system. The apparatus also includes at least one processing device. The at least one processing device is configured to obtain the information. The at least one processing device is also configured display a dashboard including the plurality of sections in a hierarchical format, and for each of the plurality of sections, display an icon for the section and visual indicators for the alarm status of the section and the operating status of the section.

A third embodiment of this disclosure provides a non-transitory computer readable medium containing instructions. The instructions when executed cause at least one processing device to obtain information associated with a plurality of sections in an industrial process control and automation system. The information includes, for each section of the plurality of sections, an operating status, an alarm status, and a location within the system. The instructions also cause the at least one processing device to display a dashboard including the plurality of sections in a hierarchical format, and for each of the plurality of sections, display an icon for the section and visual indicators for the alarm status of the section and the operating status of the section.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, control systems with automatically generated visual representations of equipment and status will often not capture all the site specific information that could be useful for operators and engineers to monitor equipment and respond to failures. Deficiency in the automatically generated visualization can be because modern control systems are open, heterogeneous, large, and complicated and not enough information is available to arrange the equipment in an intuitive way. Additionally, customer domain specific information, which part of the plant that is affected by particular equipment, is useful for responding to failures but not incorporated in the model.

The embodiments of this disclosure recognize and take into account that there is a need to combine the attributes of a universal text-based alarm list that functions in open heterogeneous systems with a graphical representation of the control system equipment that can convey context needed to rapidly ascertain the health of the system and respond to the correct problem first. There is also a need for automatically generated graphical views of different system equipment and sections.

This disclosure describes a system and method for presenting a graphical view of a system status to identify system failures. Note that in the following discussion, the systems and methods are described with respect to use in conjunction with an industrial process control and automation system. However, the systems and methods could be used with any suitable computing system and are not limited to use in industrial control and automation settings.

Figure 1:
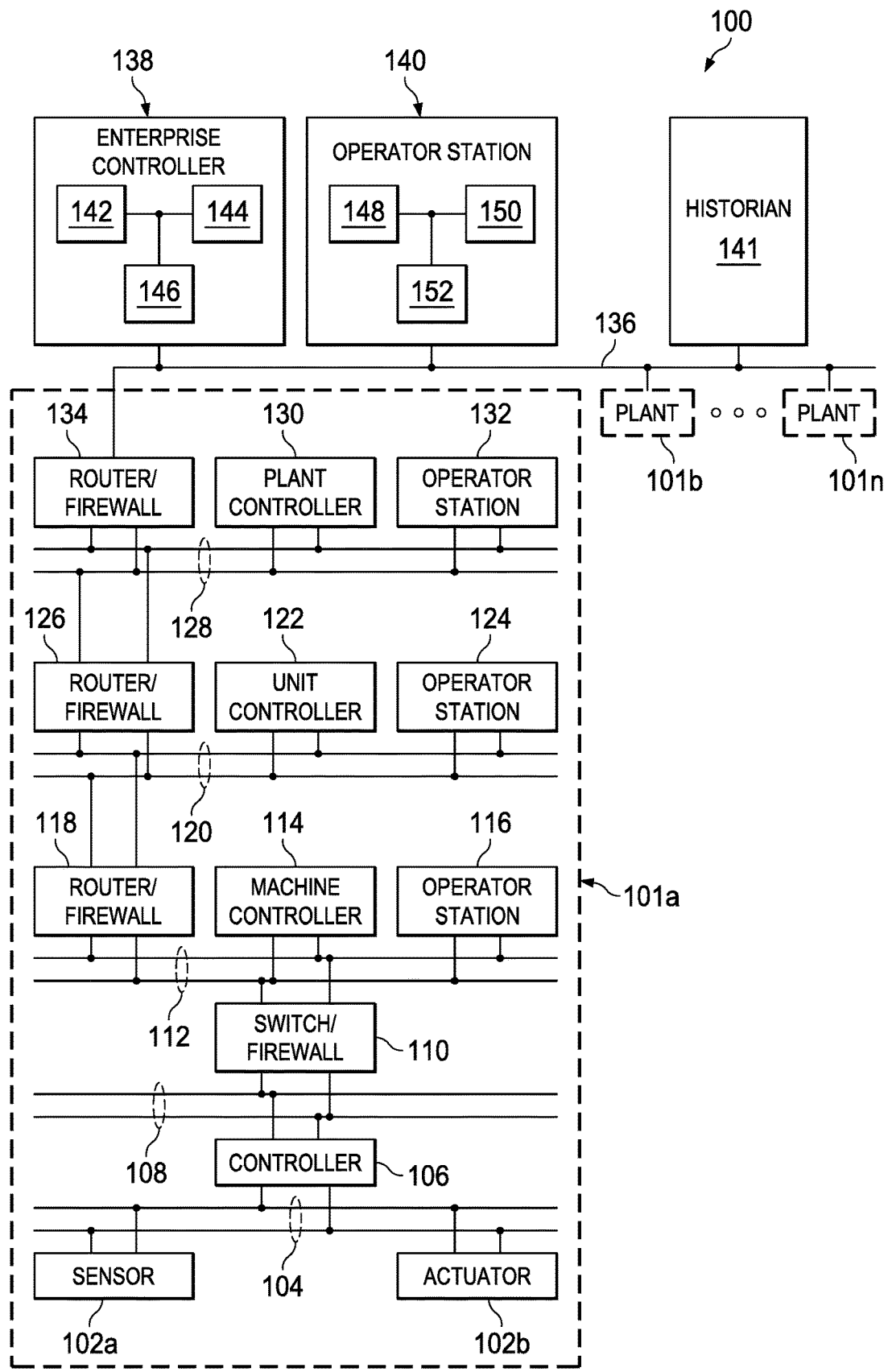
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, redundant IEC-61850, IEC-62439, Ethernet/IP (EIP), or MODBUS/TCP networks, or any other or additional type(s) of network(s). The network(s) 104 can have any suitable configuration, such as a parallel or ring topology.

In the Purdue model, "Level 1" includes one or more controllers 106, which are coupled to the network(s) 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the system 100. The historian 141 could store, for example, information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. In addition, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In one aspect of operation, an owner or operator of the process control and automation system 100 can create customized graphical displays called 'dashboards' that show equipment and relationships between them. The operator can then use these displays in an operator environment called the System Status Display (SSD) that is tightly integrated with the live status and alarms from the equipment that was added to the display. In this way, the site can have the ideal visual representation of their equipment for monitoring, failure diagnosis and response in a complicated heterogeneous control system using alarm-based failure reporting.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which certain functionalities can be used. However, FIG. 1 does not limit this disclosure to any particular configuration or operational environment. Also, as noted above, the techniques described in this disclosure could be used with any suitable computing system and are not limited to use with industrial process control and automation systems.

Figure 2:
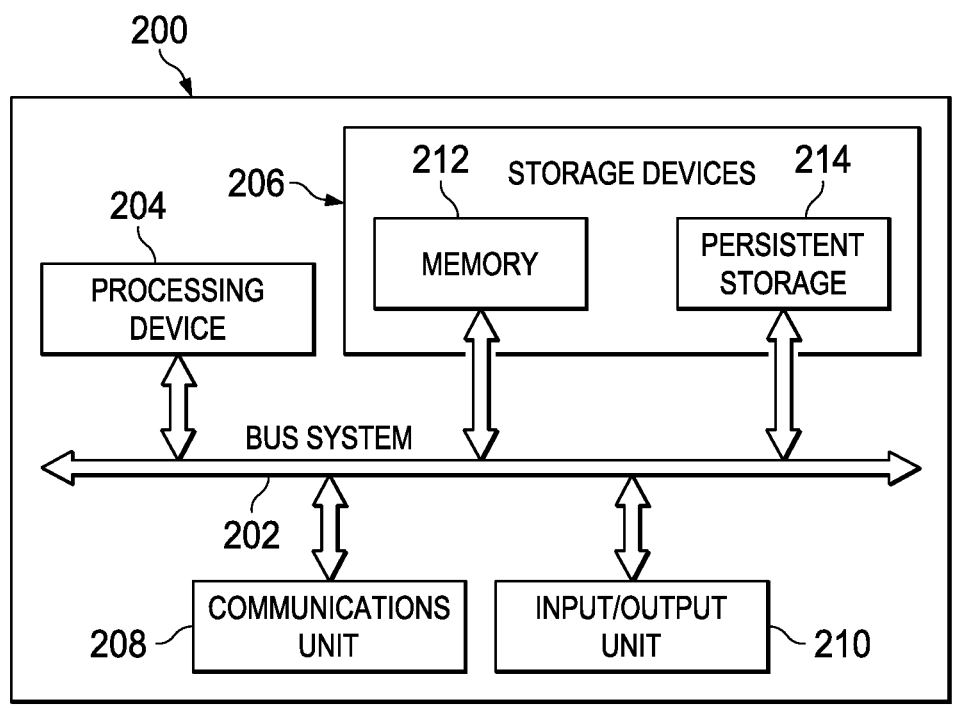
FIG. 2 illustrates an example device for presenting a graphical view of a system status to identify system failures in an industrial process control and automation system according to this disclosure.

FIG. 2 illustrates an example device 200 for presenting a graphical view of a system status to identify system failures in an industrial process control and automation system events according to this disclosure. The device 200 could represent, for example, an operator station 116, 124, 132, or 140 in the system 100 of FIG. 1. However, the device 200 could be implemented using any other suitable device or system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing to devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, cellular, Wi-Fi, universal asynchronous receiver/transmitter (UART), serial peripheral interface (SPI) or other network. The communications unit 208 could also include a wireless transceiver facilitating communications over at least one wireless network. The communications unit 208 may support communications through any suitable physical or wireless communication link(s). The communications unit 208 may support communications through multiple different interfaces, or may be representative of multiple communication units with the ability to communication through multiple interfaces.

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a device 200, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
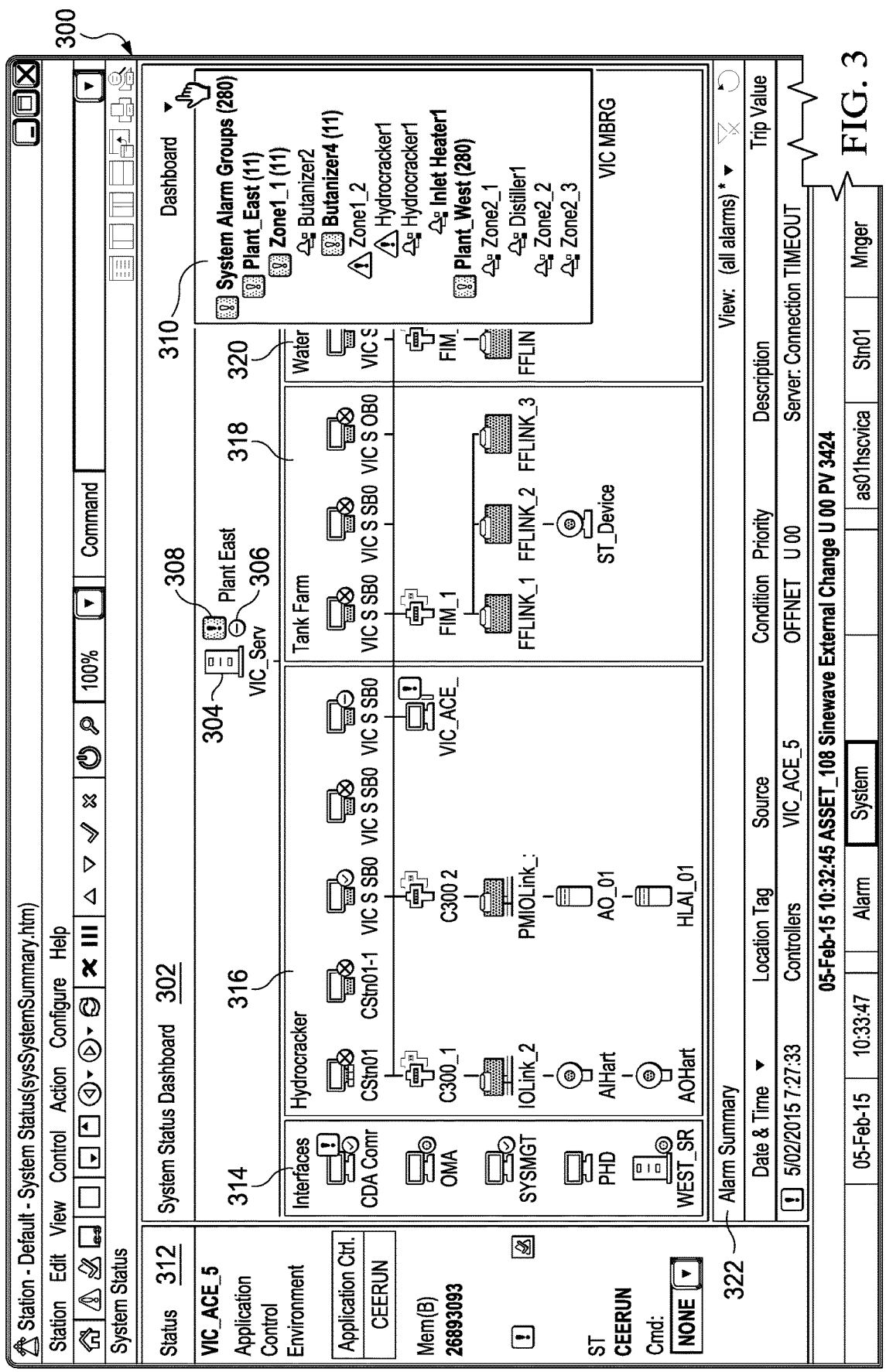
FIG. 3 illustrates an example system status display supporting visualization of a system status according to this disclosure.

FIG. 3 illustrates an example display 300 supporting visualization of a system status according to this disclosure. The display 300 could be generated, for example, by the device 200 of FIG. 2 using data collected by one or more plants 101a-101n of FIG. 1.

As shown in FIG. 3, the display 300 provides customized graphical displays referred to as "dashboards" showing equipment and relationships between them. An example dashboard can be system status dashboard 302. The dashboard 302 can include visual representation of the equipment 304 for monitoring, failure diagnosis, and response in a complicated heterogeneous control system using alarm-based failure reporting.

The dashboards can be used in an operator environment of the display 300 that is tightly integrated with the live status 306 and alarms 308 from the equipment 304 that was added to the display 300. A dashboard 302 that is opened in the display 300 conveys the current status 306 and whether an alarm 308 is present using icons overlaid on each section 304 of the system. As discussed herein, the icons can be associated with different sections of the system 100 or equipment of the section. The alarm 308 can be a visual indicator indicating that an alarm is present for that section 304, or indicating an aggregate of at least one alarm for one of the sections or equipment that is down the hierarchy from section 304, such as sections 314-320.

The status 306 can indicate that the equipment 304 is operating as expected, not operating, or has one or more issues. In FIG. 3, equipment 304 is a server for a section of the plant referred to as "plant east" and has one or more issues as noted by the status 306 as well as the alarm 308. In one example, the dashboard list 310 is present in a dropdown menu, and is also filtered to the equipment 304 shown on the dashboard 302 and is further filtered to a piece of equipment when the operator selects it on the dashboard. In another example, the dashboard list 310 is present in a collapsible pane, or other type of suitable list. The dashboard list 310 can provide a list of different dashboards, their aggregated alarm status, number of alarms, and hierarchical relationship. Selecting a dashboard in the unfiltered list 310 can change dashboard 302 to the selected dashboard. The dashboard list 310 can be presented in a hierarchical format as shown in FIG. 3. In FIG. 3, the hierarchical format is indicated by different levels of indention between the different dashboards. In this example, a dashboard is a sub-dashboard of a dashboard with less of an indent. For example, Zone2_1 is a sub-dashboard of Plant_West.

A status pane 312 on the display 300 shows a faceplate with key statistics of the selected piece of equipment. Additionally, key operations (such as enable or disable) can be executed directly from this pane 312 without leaving the display 300. An alarm summary pane 322 can include a summary of current alarms for different selected dashboards. An alarm can indicate that there is an issue with the equipment or section with the alarm. The summary pane 312 can also show alarms filtered to a single piece of selected equipment on the dashboard 302. In another example, the alarm summary pane is resizable to a hard-coded minimum size.

The dashboard 302 includes a hierarchical format. In the dashboard 302, there can be a hierarchical relationship between the different equipment and sections in the dashboard 302. In addition, there can be a hierarchical relationship between different dashboards and sub-dashboards. For example, the hydrocracker 316 shows different components within section 316, with links between the components. Additionally, list 310 shows the different selectable dashboards, with a hierarchy within the dashboards shown by indentions. Each of the dashboards in list 310 can show an aggregated alarm status and a number of alarms within the components of that dashboard. For example, Plant_East includes sub-dashboards Zone1_1 and Zone1_2, as well as sub-sub dashboards of Zone1_1 and Zone1_2. If any of these sub-dashboards includes an alarm, the alarm can be aggregated up to Plant_East dashboard and then to System Alarm Groups root node.

In one example embodiment, the dashboard 302 includes a structure for different sections of the system. In an example, equipment 304 represents a server that can be coupled to interfaces 314, hydrocracker 316, tank farm 318, and water 320. In another example, the dashboard 302 illustrates points configured on the server within one the scope of responsibility of an operator. The equipment 304 could also be coupled to other parts of plant on the dashboard 302, such as, a pipeline. The types of equipment in the down levels from the equipment 304 can include, but not limited to, stations, distributed control system (DCS) controllers, input/output controllers, supervisory control and data acquisition (SCADA) controllers, and SCADA channels.

Although FIG. 3 illustrates one example of a display 300, various changes may be made to FIG. 3. For example, components could be added, omitted, combined, further subdivided, or placed in any other suitable configuration according to particular needs. Also, graphical displays can come in a wide variety of configurations, and FIG. 3 does not limit this disclosure to any particular configuration of a graphical display.

Figure 4A:
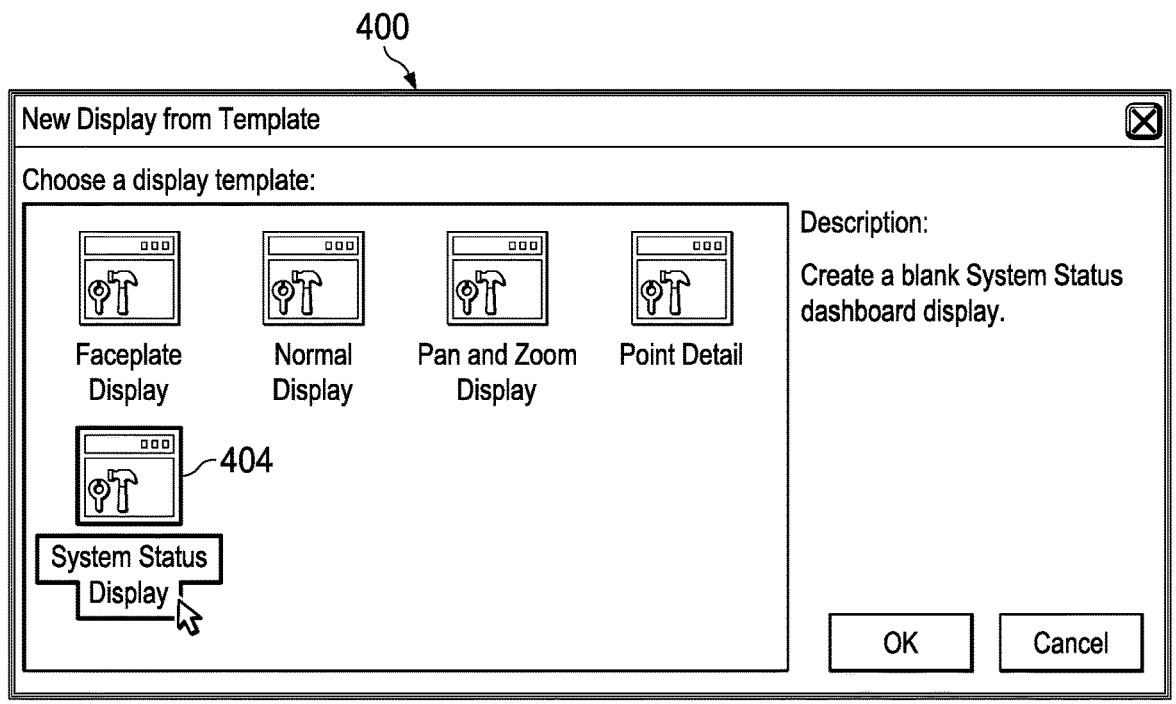
FIGS. 4A and 4B illustrate example portions of displays for customizing a dashboard using drag and drop according to this disclosure.
Figure 4B:
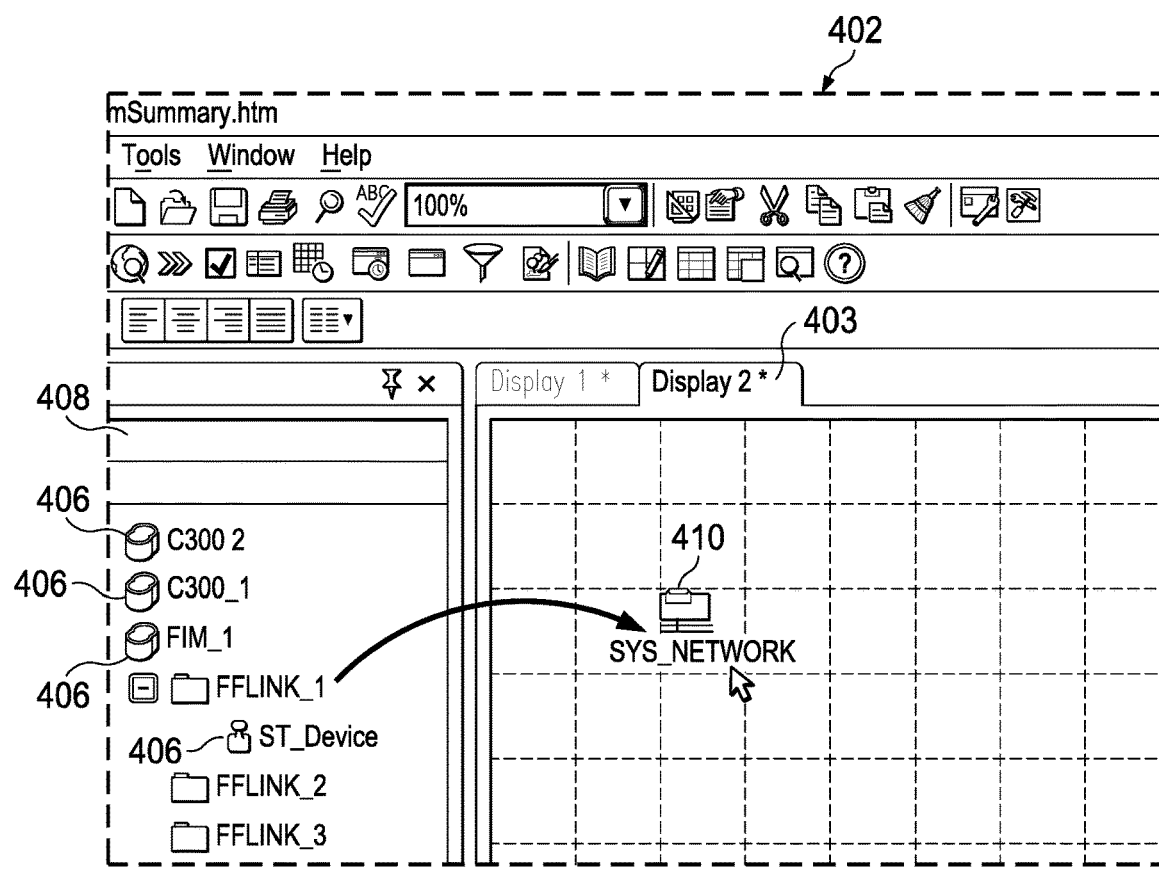

FIGS. 4A and 4B illustrate example displays 400-402 for customizing a dashboard 403 using drag and drop according to this disclosure. The displays 400-402 could be generated, for example, by the device 200 of FIG. 2 using data collected by one or more plants 101a-101n of FIG. 1.

In FIG. 4A, a number of templates can be provided, such as template 404. Different templates can be used for different types of reporting or parts of a plant or system. In FIG. 4B, equipment 406 can be different parts of system 100 in a pane 408 and can use user-friendly names. An operator can drag and drop from the pane 408 to the dashboard 403 and the shape 410 can automatically be bound and dropped.

Although FIGS. 4A and 4B illustrate examples of portions 400-402 of displays, various changes may be made to FIGS. 4A and 4B. For example, components could be added, omitted, combined, further subdivided, or placed in any other suitable configuration according to particular needs. Also, graphical displays can come in a wide variety of configurations, and FIGS. 4A and 4B do not limit this disclosure to any particular configuration of a graphical display.

Figure 5A:
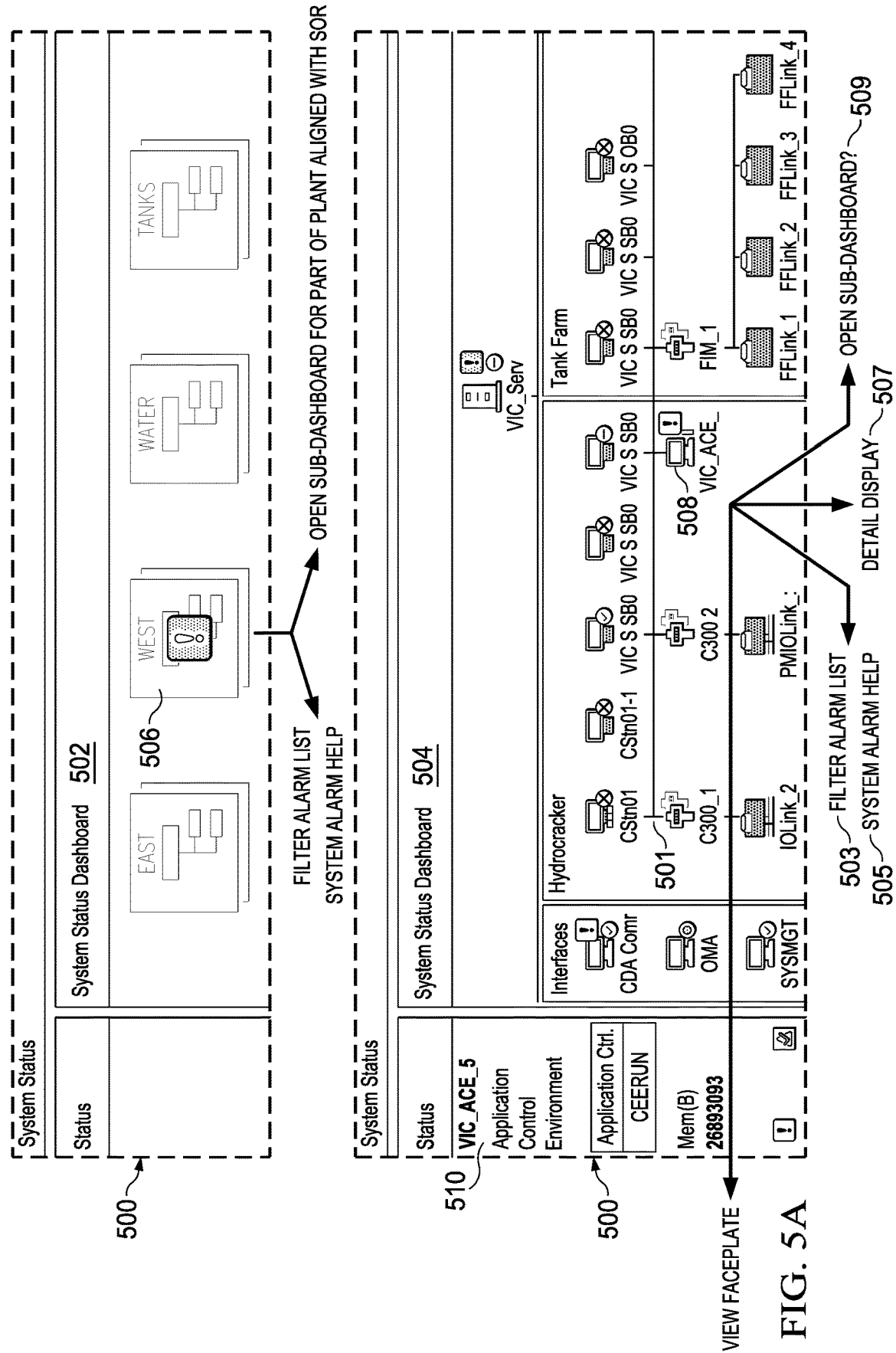
FIGS. 5A and 5B illustrate an example system status display with a dashboard and drilling down to sub-dashboards according to this disclosure.
Figure 5B:
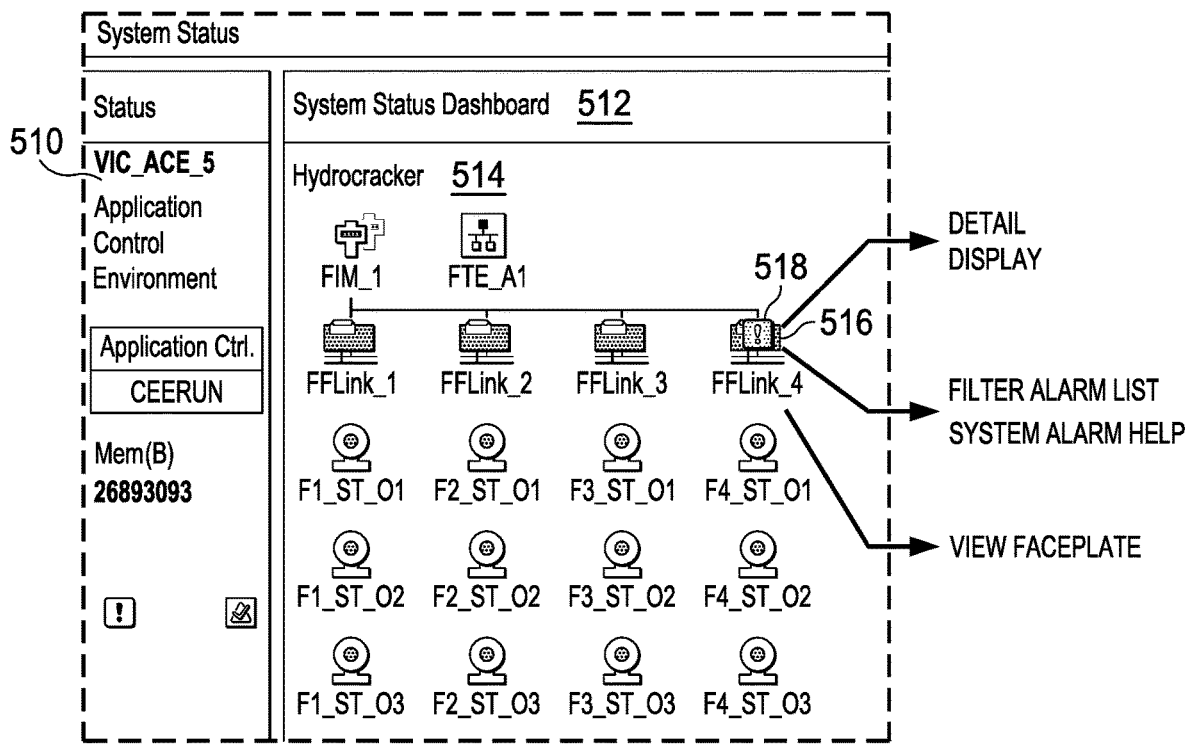

FIGS. 5A and 5B illustrate an example system status display 500 with a dashboard 502 and drilling down to sub-dashboards 504 and 512 according to this disclosure. The dashboards 502, 504, and 512 could be generated, for example, by the device 200 of FIG. 2 using data collected by one or more plants 101a-101n of FIG. 1. Display 500 can be one example of the display 300 of FIG. 3.

In FIG. 5A, for large systems or sections of the control system with different scopes of responsibility for various operators, multiple dashboards 502-504 can be created and sections/equipment can be arranged with links 501 between them in a hierarchical format. A high-level overview dashboard 502 indicates if a sub-dashboard 504 has an alarm present. An operator can select an icon 506 to navigate to the sub-dashboard 504 within the display. In one example, the system filters the alarm list to the new narrower scope of equipment shown. The alarm list can be at each icon, which can represent equipment, an operator can filter an alarm list 503, obtain system alarm help for an active alarm 505, view a faceplate 510 showing the status of the equipment and key statistics of the equipment, display detailed information of the equipment 507, and open a sub-dashboard for that equipment 509. In different examples, some or all of these options are available for different pieces of equipment or section of the system. In one example, the alarm list can be alarm summary 322 as shown in FIG. 3. In another example, the alarm list can be shown in dashboard list 310. In yet another example, the alarm list can be the combination of alarm statuses on dashboard 504.

In FIG. 5B, the dashboard has been drilled down to sub-dashboard 512. The sub-dashboard 512 could show the equipment in the hydrocracker section 514 of the system. One of the components or equipment of the hydrocracker 514 can be designated by an icon 516. The icon 516 has a visual indicator 518 indicating an alarm status. The indicator 518 can indicate that an underlying component of the equipment associated with icon 516 has an issue or problem. In another example, if there are no further underlying components, then the issue can be with the equipment associated with the icon 516. An operator is able to perform an action on the icon by selecting the icon. The actions can include viewing the faceplate 510, displaying detailed information of the parameters and status of the equipment or section associated with the icon 516, filter the alarms of the icon 516, and obtain system alarm help.

Although FIGS. 5A and 5B illustrates one example of dashboards 502, 504, and 512, various changes may be made to FIGS. 5A and 5B. For example, components could be added, omitted, combined, further subdivided, or placed in any other suitable configuration according to particular needs. Also, dashboards can come in a wide variety of configurations, and FIGS. 5A and 5B do not limit this disclosure to any particular configuration of a dashboard.

Figure 6:
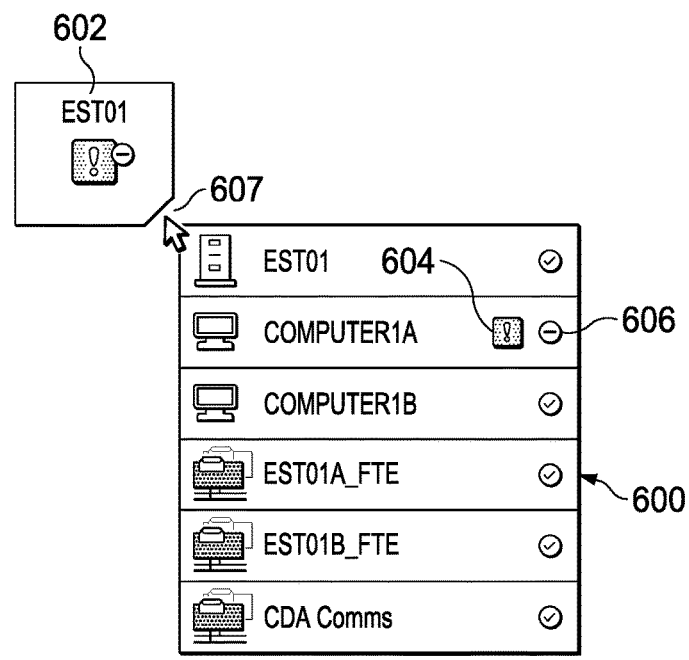
FIG. 6 illustrates an example list of sections of a process control system according to this disclosure.

FIG. 6 illustrates an example illustrates an example list 600 of sections of a process control system according to this disclosure according to this disclosure. The list 600 could be generated, for example, by the device 200 of FIG. 2 using data collected by one or more plants 101a-101n of FIG. 1. The list 600 can be provided as an action from selection of the icon 602. The icon 602 could be one example of any icon for any section, equipment, or group of equipment in FIGS. 3-5B.

In FIG. 6, each section in the list 600 can be associated with an icon shape that can indicate the type of equipment. Each of the equipment can have a name, an operating status 606, and an alarm status 604. A section can be a single piece of equipment, a group of equipment, or a group of sections. If there is an alarm 604, then the alarm can also show on the group icon 602. In an example, the group icon 602 can be referred to as a composite, which includes multiple components.

In one example embodiment, clicking on the tab 607, or the icon 602 itself, can show the list 600 as a flyout menu or some other suitable format. The list 600 can break down the status and alarm indication of different aspects of equipment. In this example, list 600 includes one logical server having two redundant computers, two network interfaces, and one control network (CDA) interface.

This aggregation of alarm indication is achieved by creating system alarm groups with a dashboard to include all equipment in the group. The system automatically monitors the alarm list as alarms are raised, returned to normal, and acknowledged so that the correct aggregate alarm indication is available for a dashboard link when the icon 602 is shown in the dashbaord.

In one or more example embodiments, composite equipment can be engineered when creating the dashboard to group several pieces of equipment into one logical icon on the dashboard. When viewed in the dashboard, the status information and alarm indication can be aggregated together to save space on the dashboard. A drop down or fly out menu can provide the individual component equipment if desired. Selecting the composite item can filter the alarm list to alarms from all of the component pieces of equipment, show the alarm state, and show a status of composite. The composite can be the equipment or section representation of the icon. That is, the composite can be the icon and include the equipment under the hierarchy of the section associated with the icon. Double clicking, or another type of selection mechanism, on equipment can navigate to a detailed display of the equipment for further investigation of response.

Selecting an alarm in the alarm list can collapse the dashboard pane of the display and open a details pane that provides more information and help for the specific alarm. The tight integration of a customizable graphical view of equipment can support large, complex, heterogeneous control systems, with an alarm list and facilities to access alarm and equipment detail in the same operator environment.

FIGS. 3 through 6 illustrate example dashboards supporting visual indication of alarms statuses and operating statuses in sections and equipment of a system according to this disclosure. The dashboards could be generated in a display, for example, by the device 200 of FIG. 2 using data collected by one or more plants 101*a*-101*n* of FIG. 1. In FIGS. 3 through 6, color or other graphical mechanisms can be used to code different values for visual feedback. For example, the statuses can be colored differently depending on whether an alarm is triggered, a device is operational, etc. If a user selects any of the icons shown in the dashboards or otherwise indicates a desire to "drill down" into the individual icons representing sections or equipment, a sub-dashboard can be presented to the user.

Figure 7:
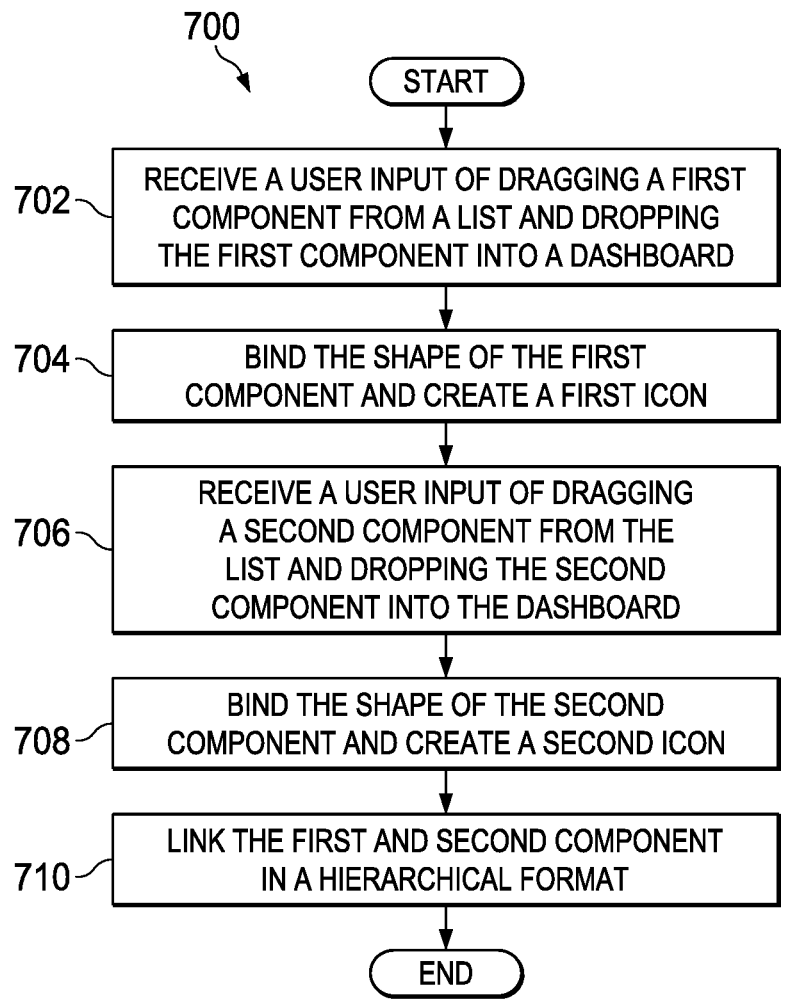
FIG. 7 illustrates an example process of customizing a dashboard according to this disclosure.

FIG. 7 illustrates example process 700 of creating a dashboard in a system according to this disclosure. For ease of explanation, FIG. 7 is described with respect to the device 200 of FIG. 2 implemented as shown in FIG. 3. However, the process of FIG. 7 could be performed using any suitable device and in any suitable system.

As shown in FIG. 7, the process 700 supports creating a dashboard through a drag and drop process. At step 702, a device 200 can receive a user input of dragging a first component from a list and dropping the first component into a dashboard. The first component can be a section of a system 100 as in FIG. 1 or a piece of equipment within the system 100. At step 704, the device 200 can bind the shape of the first component and create a first icon. Binding a shape is creating an icon, extracting references for control system hardware, and embedding the references into the icon. That is, the device 200 can locate a physical field device or equipment, associate that equipment with the icon, and allow an operator to manipulate the icon by performing actions to manage the equipment. The system can locate the actual device and retrieve operational status.

At step 706, a device 200 can receive a user input of dragging a second component from a list and dropping the second component into a dashboard. The second component can be a section of a system 100 as in FIG. 1 or a piece of equipment within the system 100. At step 708, the device 200 can bind the shape of the second component and create a second icon. The second component can also be a sub-dashboard.

When linking a sub-dashboard, the system can aggregate alarms from the sub-dashboard components and include any alarms into an alarm status of the dashboard that includes the sub-dashboard. For example, if the first and second components are each their own sub-dashboard and one of them has an alarm during operation, then the dashboard the first and second components are created in includes an alarm for the aggregate. During the creation process, an operator can link components as well as dashboards into a hierarchical format, with each dashboard having multiple components. The hierarchy can be based on location of the equipment, section, or component in the system. In other examples, the hierarchy can be based on a logical diagram based on system levels, such as Purdue model levels. In yet other examples, the hierarchy can be solely based on operator input for operator ease of use.

At step 710, the device 200 can link the first and second components in a hierarchicial format. In this example, a user can select the two components to link. One component can be a sub-component of the other, or they can be components on the same level of the hierarchy.

Although FIG. 7 illustrate examples of process 700 supporting presenting a graphical view of an alarm statuses in a system, various changes may be made to FIG. 7. For example, while each figure shows a series of steps, various steps in each figure could overlap, occur in parallel, occur in a different order, or occur any number of times.

Figure 8:
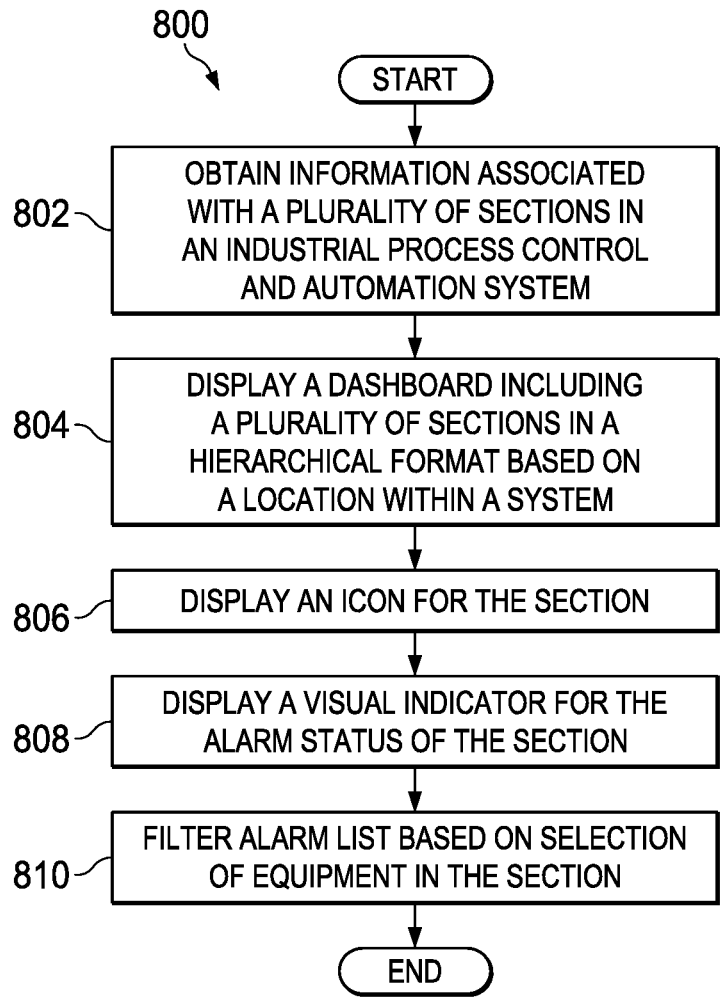
FIG. 8 illustrates an example process of presenting a graphical view of a dashboard according to this disclosure.

FIG. 8 illustrates example process 800 of presenting a graphical view of a dashboard according to this disclosure. For ease of explanation, FIG. 8 is described with respect to the device 200 of FIG. 2 implemented as shown in FIG. 3. However, the process of FIG. 8 could be performed using any suitable device and in any suitable system.

As shown in FIG. 8, the process 800 supports presenting a graphical view of an alarm statuses in a system. At step 802, a device can obtain information associated with a plurality of sections in an industrial process control and automation system. This could include, for example, the device 200 obtaining information about the different sections and equipment in the system. The information could be used to identify an alarm status for each equipment or component.

At step 804, the device 200 can display a dashboard including a plurality of sections in a hierarchical format. The hierarchical format can group equipment and use an icon as a representation for that group or section. At step 806, the device 200 can display an icon for the section. The section could include a number of equipment groups, equipment, or additional sections. At step 808, the device 200 can display a visual indicator for the alarm status of the section. The visual indicator for the alarm status that is active can be associated with an alarm in an alarm list. In an example embodiment, at step 808, the device 200 can also display a visual indicator for the operating status. The alarm status that is active for a section of the plurality of sections can indicate an issue with at least one equipment of the section. In one or more embodiments of this disclosure, presenting an alarm status can include not presenting any visual indication when there is no alarm present. That is, the icon or visual indicator only appears when an alarm is present.

In one or more embodiments of this disclosure, the device 200 can provide, responsive to selection of an icon by an operator, one or more actions for a section associated with the icon. The action can include displaying key statistics of the section associated with the icon, displaying a sub-dashboard of equipment from the section associated with the icon, filtering an alarm list, and showing that the icon is selected. In this example, at step 810, the device 200 can filter an alarm list based on selection of equipment in that section. For example, if equipment associated with the section is selected, then the alarm list can filter to show only alarms associated with that selected equipment.

In another example, a section can be selected that is a sub-section of the previously shown section. For example, a plant can include a tank. If the tank is selected, then the alarm list can show only alarms associated with the tank. During presentation of the dashboard, the device 200 can receive an input to customize the hierarchical format of the dashboard. The customization can be to select a sub-dashboard associated with a component of the dashboard, to filter the alarm list based on an equipment selection, and the like.

Further, in an example embodiment, the device 200, responsive to selecting an icon, can provide one or more actions for a section associated with the icon. In one example, the one or more actions include displaying key statistics of the section associated with the icon. In another example, the one or more actions include displaying a sub-dashboard of equipment from the section associated with the icon. The alarm status that is active for a section of the plurality of sections can indicate an issue with at least one equipment of the section. In another example, the list of alarms can be filtered upon selection of an icon.

Although FIG. 8 illustrate examples of process 800 supporting presenting a graphical view of an alarm statuses in a system, various changes may be made to FIG. 8. For example, while each figure shows a series of steps, various steps in each figure could overlap, occur in parallel, occur in a different order, or occur any number of times.

The approaches described above can help to provide technical solutions to various technical problems, such as in the field of system plant management. For example, plants can include a large number of devices, making it extremely difficult or impractical for users to ensure that the devices are being managed or serviced properly. The lack of effective oversight means the users cannot tell how well the devices are being managed or serviced. For some devices, this could allow the devices to remain vulnerable to different issues causing alarms. This could allow the devices to provide less than optimal or even undesirable process control and automation functionality. The approaches described in this disclosure help users to verify that their devices are being managed and serviced at an appropriate level much more easily compared to conventional approaches.

One or more embodiments of this disclosure provide a customizable graphical view overlaid on a text alarm list that allows multiple relationships between equipment relevant to an impact assessment and technical diagnosis conveyed easily and intuitively. For example, network connection via lines, upstream/downstream relationship and row on display, type of equipment via icons, physical location or process unit via grouping boxes and columns. Furthermore, fixed and meaningful graphical position of equipment allows for human operator pattern recognition.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for presenting a graphical view of system status for identifying system failures in an industrial process control system, the method comprising:
  obtaining information associated with a plurality of sections in the industrial process control and automation system, wherein the information includes, for each section of the plurality of sections, one or more of an operating status, an alarm status, and a location of each of the plurality of sections within the system;
  creating a dashboard with the obtained information by:
    dragging first and second components from a list and dropping the first and second components into a dashboard wherein the components comprise a section or hardware and equipment of the industrial process control system,
    binding the shape of the first and second components and creating an icon by extracting references for the industrial process control system hardware and equipment and embedding the references to the icon, and
    linking the first and second components in a hierarchical format; and
  displaying a dashboard including the plurality of sections in the hierarchical format, and for each of the plurality of sections:
  displaying an icon for the section;
  displaying visual indicators for the alarm status of the section and the operating status of the section, wherein the alarm status includes an aggregate alarm status of all equipment within the section based on the hierarchical format; and
  receiving an input to customize the hierarchical format of the dashboard, wherein the section of the plurality of sections, the operating status, and the alarm status are based on the hierarchical format, and wherein the hierarchical format is based on at least one of a location of the equipment, the section, or the components of the industrial process control system.

2. The method of claim 1, wherein the visual indicator for the alarm status that is active is associated with an alarm in an alarm list.

3. The method of claim 1, further comprising:
  responsive to selecting an icon, providing one or more actions for a section associated with the icon.

4. The method of claim 3, wherein an action of the one or more actions comprises displaying key statistics of the section associated with the icon.

5. The method of claim 3, wherein an action of the one or more actions comprises one or more of displaying a sub-dashboard of equipment from the section associated with the icon, filtering an alarm list, and showing the icon is selected.

6. The method of claim 1, wherein an alarm status that is active for a section of the plurality of sections indicates an issue with at least one equipment of the section.

7. An apparatus for presenting a graphical view of system status for identifying system failures in an industrial process control system, the apparatus comprising:
  a memory configured to store information associated with a plurality of sections in an industrial process control and automation system, wherein the information includes, for each section of the plurality of sections, one or more of an operating status, an alarm status, and a location of each of the plurality of sections within the system; and
  at least one processing device configured to:
    obtain the information;
    creating a dashboard with the obtained information by:
      dragging first and second components from a list and dropping the first and second components into a dashboard wherein the components comprise a section or hardware and equipment of the industrial process control system,
      binding the shape of the first and second components and creating an icon by extracting references for the industrial process control system hardware and equipment and embedding the references to the icon, and
      linking the first and second components in a hierarchical format;
    display a dashboard including the plurality of sections in the hierarchical format, and for each of the plurality of sections, display an icon for the section and visual indicators for the alarm status of the section and the operating status of the section, wherein the alarm status includes an aggregate alarm status of all equipment within the section based on the hierarchical format; and
    receive an input to customize the hierarchical format of the dashboard, wherein the section of the plurality of sections, the operating status, and the alarm status are based on the hierarchical format, and wherein the hierarchical format is based on at least one of a location of the equipment, the section, or the components of the industrial process control system.

8. The apparatus of claim 7, wherein the visual indicator for the alarm status that is active is associated with an alarm in an alarm list.

9. The apparatus of claim 7, wherein the at least one processing device is further configured to:
  responsive to selecting an icon, provide one or more actions for a section associated with the icon.

10. The apparatus of claim 9, wherein an action of the one or more actions comprises displaying key statistics of the section associated with the icon.

11. The apparatus of claim 9, wherein an action of the one or more actions comprises displaying a sub-dashboard of equipment from the section associated with the icon, filtering an alarm list, and showing the icon is selected.

12. The apparatus of claim 7, wherein an alarm status that is active for a section of the plurality of sections indicates an issue with at least one equipment of the section.

13. A non-transitory computer readable medium containing instructions for presenting a graphical view of system status for identifying system failures in an industrial process control system, that when executed cause at least one processing device to:
  obtain information associated with a plurality of sections in the industrial process control and automation system, wherein the information includes, for each section of the plurality of sections, one or more of an operating status, an alarm status, and a location within the system;
  creating a dashboard with the obtained information by:
    dragging first and second components from a list and dropping the first and second components into a dashboard wherein the components comprise a section or hardware and equipment of the industrial process control system,
    binding the shape of the first and second components and creating an icon by extracting references for the industrial process control system hardware and equipment and embedding the references to the icon, and linking the first and second components in a hierarchical format;

display a dashboard including the plurality of sections in the hierarchical format, and for each of the plurality of sections, display an icon for the section and visual indicators for the alarm status of the section and the operating status of the section, wherein the alarm status includes an aggregate alarm status of all equipment within the section based on the hierarchical format; and receiving an input to customize the hierarchical format of the dashboard, wherein the section of the plurality of sections, the operating status, and the alarm status are based on the hierarchical format, and wherein the hierarchical format is based on at least one of a location of the equipment, the section, or the components of the industrial process control system.

14. The non-transitory computer readable medium of claim 13, wherein the visual indicator for the alarm status that is active is associated with an alarm in an alarm list.

15. The non-transitory computer readable medium of claim 13, further comprising instructions to:

responsive to selecting an icon, provide one or more actions for a section associated with the icon.

* * * * *